Dec. 16, 1930.                    D. SOLODAR                    1,785,100
                               ADVERTISING DEVICE
                           Filed Oct. 26, 1929        8 Sheets-Sheet 1

INVENTOR.
DAVID SOLODAR.
BY
ATTORNEYS.

Dec. 16, 1930. D. SOLODAR 1,785,100
ADVERTISING DEVICE
Filed Oct. 26, 1929   8 Sheets-Sheet 2

Dec. 16, 1930. D. SOLODAR 1,785,100
ADVERTISING DEVICE
Filed Oct. 26, 1929 8 Sheets-Sheet 3

INVENTOR.
DAVID SOLODAR.
BY
ATTORNEYS.

Dec. 16, 1930. D. SOLODAR 1,785,100
ADVERTISING DEVICE
Filed Oct. 26, 1929  8 Sheets-Sheet 4

Fig. 7.

INVENTOR
DAVID SOLODAR.

Dec. 16, 1930.  D. SOLODAR  1,785,100
ADVERTISING DEVICE
Filed Oct. 26, 1929  8 Sheets-Sheet 7

INVENTOR.
DAVID SOLODAR.
BY
ATTORNEYS.

Patented Dec. 16, 1930

1,785,100

UNITED STATES PATENT OFFICE

DAVID SOLODAR, OF EPHRATA, PENNSYLVANIA

ADVERTISING DEVICE

Application filed October 26, 1929. Serial No. 402,575.

My invention relates to a new and useful advertising device, and it relates more particularly to an advertising device constructed to simulate a miniature stage upon which may be displayed any desired advertising indicia such as pictures, mottoes, slogans, scenes from a current moving or speaking picture, and the like, in a manner calculated to attract and hold the attention and clearly to impress upon the mind of the observer the subject matter of the advertisement being displayed.

My invention further relates to a novel advertising device, whereby a plurality of advertising indicia may be displayed successively and in rotation, with a frequently varying color effect to display the subject matter of the advertisement in various colors, more clearly to impress the mind of the observer and to display such advertisements to better advantage than heretofore.

My invention still further relates to a novel advertising device adapted to be constructed in different sizes for use either in small limited spaces, such as the show window of a store or office, or for use, on a large scale on the roofs of buildings and in open spaces.

My invention still further relates to a novel advertising device which is equally adapted for use at night time, or in day time, my novel construction being such as is equally effective under all conditions.

My invention still further relates to a novel advertising device which may be controlled and operated from a remote switch, without any attention or servicing on the part of the operator, and with great efficiency and economy.

My invention still further relates to a novel advertising device, wherein the change of pictures, scenes, slogans or other advertising matter is effected easily and expeditiously, with a minimum interruption of the operation of the device.

To the above ends, my invention consists of a novel advertising device, the outer casing of which is constructed to simulate a miniature stage, provided with foot lights, side and top lights and a split drop curtain, and means for intermittently opening and closing or raising and dropping said curtain.

My invention still further consists in novel means for energizing the various lights intermittently, alternately, synchronously and according to a given predetermined order in connection with the raising and dropping of said curtain.

My invention still further consists in the provision of a revoluble, polygonal drum adapted to carry the desired advertising material and positioned within said casing, and drum actuating means comprising means for laterally displacing said drum from and towards the curtains, the revolution of said drum being effected by and simultaneously with said displacement, the curtains being closed during the rotation and lateral movement of said drum and being opened when the drum is at a state of rest.

My invention still further consists of a novel drum construction, which in addition to being light and durable, also lends itself to the rapid and easy exchange of the advertising material carried thereby.

My invention still further consists in the novel construction, arrangement, collocation and synchronization of said drum, lights and curtain to produce orderly, harmonious and effective results, all as hereinafter described and claimed.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figure 1:
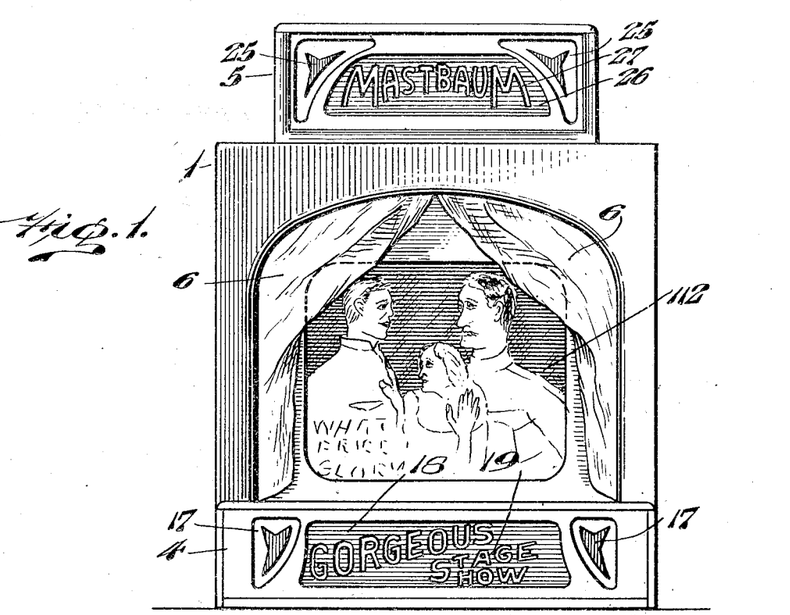
Figure 1, represents a view in front elevation of a miniature stage advertising device embodying my invention with the curtain raised or opened.
Figure 2:
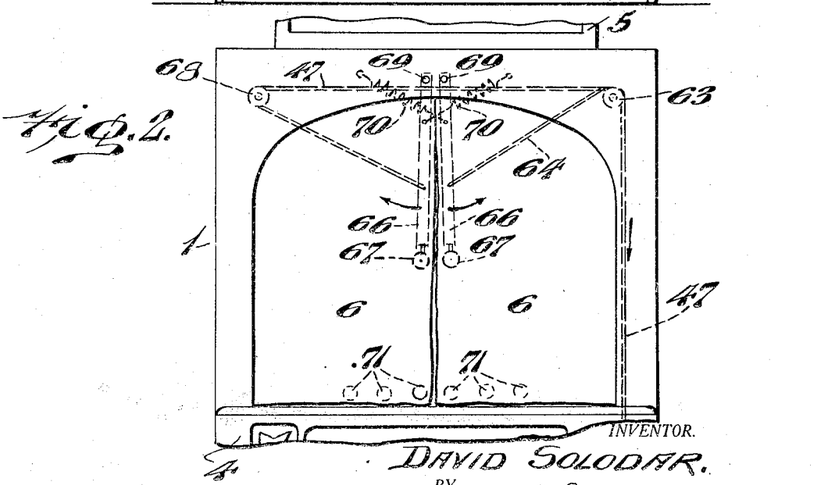
Figure 2, represents, a fragmentary view similar to Figure 1, showing the curtain dropped or closed.
Figure 3:
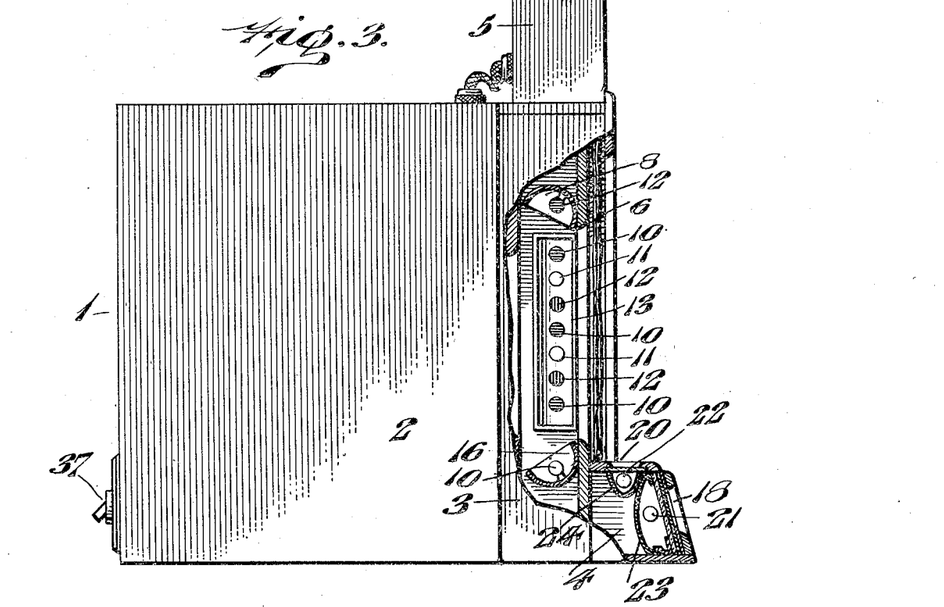
Figure 3, represents a view in side elevation, a part of the outer casing being removed to show the internal lighting construction.
Figure 7:
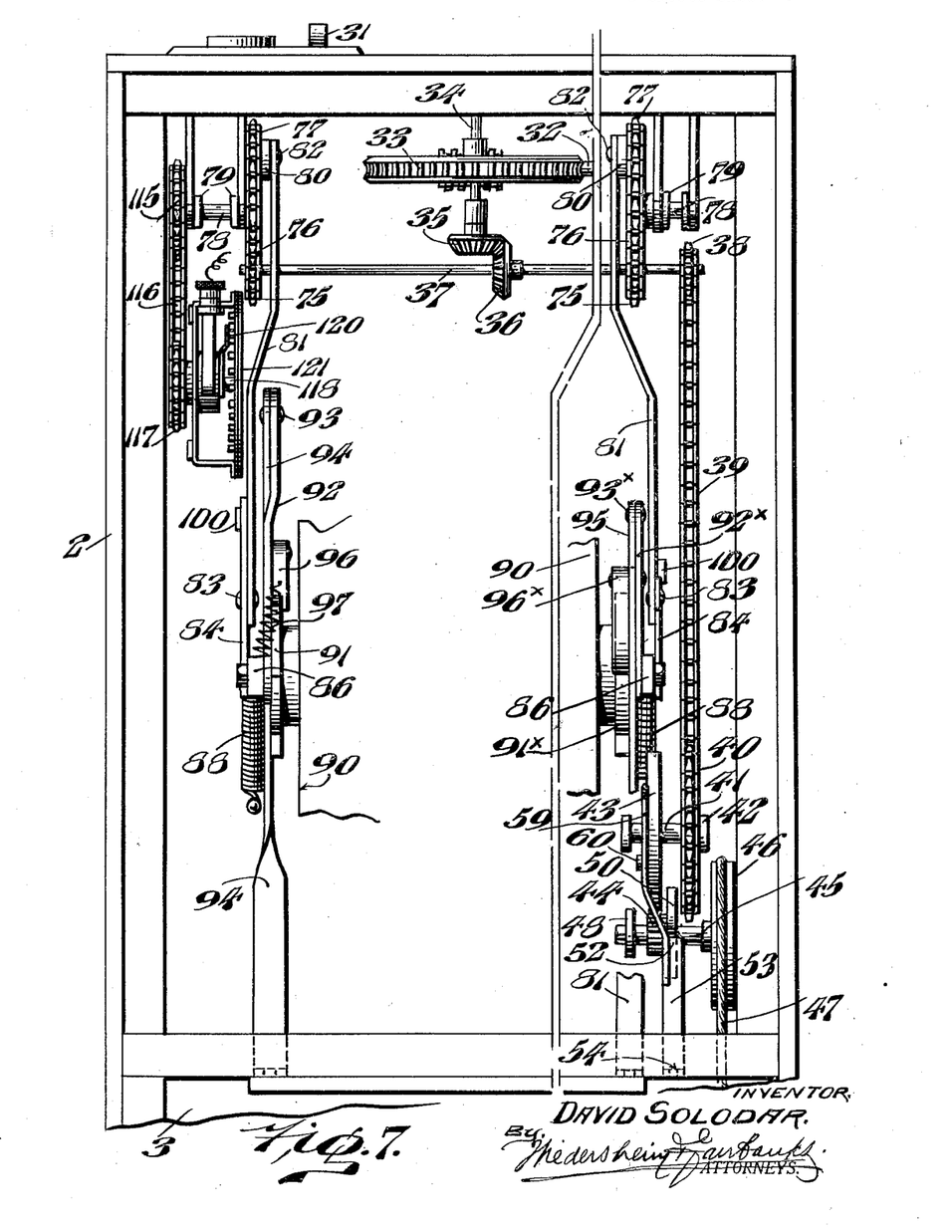
Figure 7, represents on an enlarged scale, a plan view, similar to Figure 5, of the power transmission devices, certain parts being omitted.

Referring to the drawings, in which like reference characters indicate like parts, 1 designates my novel miniature stage advertising device embodying my invention, comprising a main, rear, outer casing 2, a front casing 3, the bottom front horizontal casing 4 and the front top casing 5. The front casing 3 is constructed to simulate a miniature stage and is provided with a split or two piece curtain 6, the operation of which will be hereinafter described and with the vari-colored lights 10, 11 and 12 distributed in the top reflector 8, the opposite side reflectors 13 and the bottom reflector 16, said lights being energized in a manner hereinafter described, in connection with the diagram seen in Figure 12. The bottom front casing 4 is provided with any suitable decorations 17, the front transparent or translucent plate 18 carrying any suitable indicia 19 and with the upper elongated horizontal translucent or transparent place 20. The front plate 18 and the upper plate 20 are suitably illuminated from within by lights 21 and 22 which are positioned within the reflectors 23 and 24 respectively. The top casing 5 is similarly provided with suitable ornamentations 25, and with a vertical front translucent or transparent plate 26 carrying any suitable indicia 27, said plate being illuminated by the light 28 within the reflector 29. The lighting effect in the bottom casing 4, the top casing 5 and the front casing 3 will be hereinafter described in connection with the lighting arrangement shown in Fig. 12. In the rear of the casing 2 is positioned a universal motor 30 (best seen in Figure 5, and omitted from Figure 7 for clearness of illustration) controlled by the external switch 31. The motor shaft carries the worm 32, which meshes with the worm gear 33 on the shaft 34. (See Figures 5 and 7.) The shaft 34 carries the bevel gear 35 which meshes with the bevel gear 36 on the shaft 37, which carries the sprocket wheel 38 over which passes the sprocket chain 39 which also passes over the sprocket wheel 40 mounted upon the shaft 41 journalled in the bracket 42, (see Figures 7, 9 and 10). The shaft 41 also carries a mutilated gear 43 which intermittently meshes with the pinion 44 on the shaft 45 which carries the pulley 46 on which is wound the cord 47, the shaft 45 being journalled in the bracket 48 which also carries the mutilated gear 50, the teeth 51 of which are adapted to be engaged by the end 52 of the arm 53 which is pivoted at 54 to the rear wall of the casing 3 and which is pulled downwardly by the spring 55. The pulley 46 is provided with a lug 56, which is adapted to coact with the stop 57 to limit the rotation of said pulley when the latter is released by the engagement and raising of the extension arm 59 of the arm 53 by the lug 60 on the mutilated gear 43. The cord 47 passes under the pulley 62 in the bottom portion of the front casing 3 and extends upwardly and passes over the pulley 63 in the upper portion of the front casing 3, (see Figure 2). After passing over the pulley 63 the cord 47 is provided with an extension 64 which is connected to a rod 66 having the weight 67 and secured to one portion of the curtain 6, while the cord 47 proper extends across the front casing 3, passes over the pulley 68 and is connected to a similar rod 66 secured to the other portion of the curtain 6. The rods 66 are pivoted at 69 and are adapted to swing outwardly and upwardly in the direction of the arrows when tension or pull is applied to the cord 47 in advance of the pulley 63. The springs 70, together with the weighted rods 66 and, if desired, the bottom curtain weights 71 serve to drop the curtain 6 to the closing position shown in Fig. 2, when the tension on the cord 47 is relieved. The operation of raising and dropping the split curtain 6 from the position seen in Figs. 1 and 4 to that shown in Figs 2 and 3 is effected as follows:—

Figure 8:
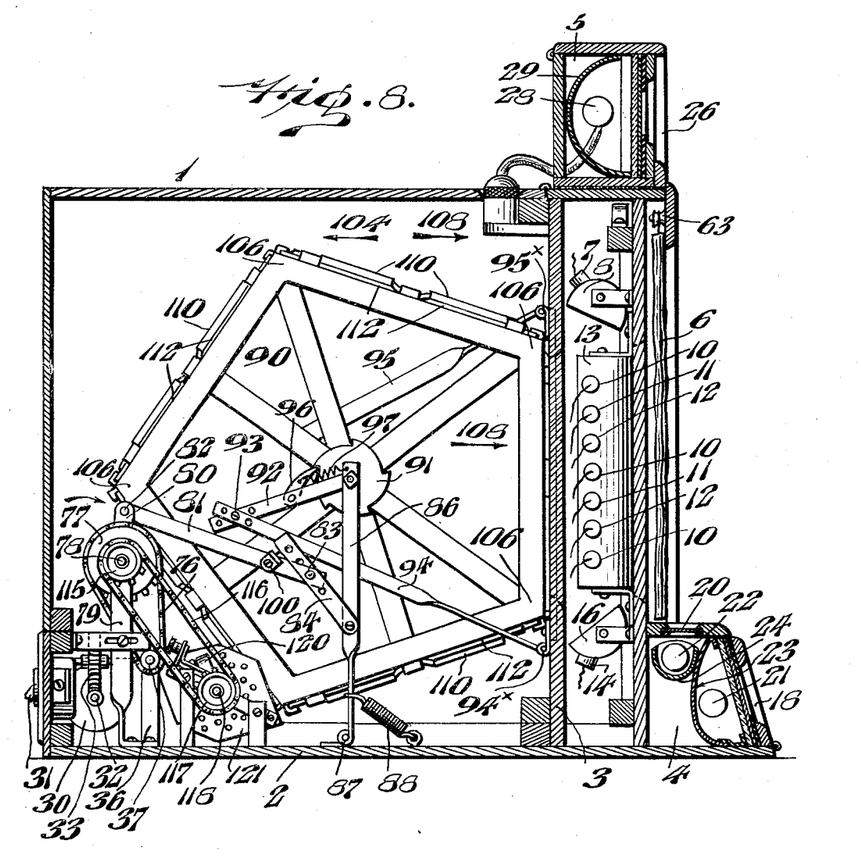
Figure 8, represents a view in side elevation similar to Figure 3, but with the casing removed to show the internal construction, certain parts being shown in section.

When the motor 30 is energized by the switch 31, the shaft 37 is set in motion by the intermediate mechanism, thereby also revolving the sprocket wheel 40 by means of the sprocket wheel 38 and chain 39, thereby also revolving the mutilated gear 43 which is fast on the shaft 41. The mutilated gear 43 is provided with a small number of teeth, so that it will only intermittently, once for each revolution of the sprocket wheel 40, engage the pinion 44 on the shaft 45 to turn the pulley 46, whereby the cord 47 is wound upon said pulley to open or raise the curtain 6. To release or drop the curtain 6 at stated intervals I provide the lug 60 on the mutilated gear 43 which is adapted to raise the arm 59 carried by the arm 53 which is pivoted at 54 to the rear portion of the front casing 3 and urged downwardly by the spring 55 thereby to disengage the end 52 of the arm 53 from the teeth 51 of the mutilated gear or ratchet wheel 50, thereby permitting the free rotation of the pulley 46 on the shaft 45, the curtain 6 being then dropped by the springs 70, weighted rods 66 and the bottom weights 71. The engagement of the end 52 of the arm 53 with the teeth 51 of the mutilated gear 50 serves to prevent the backward rotation of the pulley 46 during the engagement of the mutilated gear 43 with the pinion 44, that is, during the raising of the curtain 6 by the winding of the cord 47 over the pulley 46. Thus the curtain is raised and dropped or opened and closed with every revolution of the gear 43 on the shaft 41, the number of the teeth of the gear 43, the size of the pinion 44 on the shaft 45 and the size of the pulley 46 being regulated in accordance with the length of the cord 47 which must be taken up to raise the curtain 6. The shaft 37 also carries the sprocket wheels 75 over which pass the sprocket chains 76, which also pass over the sprocket wheels 77 carried by the shafts 78, journalled in the brackets 79. The sprocket wheels 77 carry the arms or pins 80, to which are pivoted the levers 81 at 82, said levers 81 having pivoted thereto at 83 the links 84, which are pivoted at 85 to the levers 86, pivoted at their lower ends at 87 to the bottom of the casing 2, and urged forwardly towards the casing 3 by the springs 88. In the top of the levers 86 is journalled the shaft 89 which carries the drum 90 which is provided with the ratchet wheels 91 and 91$^x$ on either side thereof. 92 and 92$^x$ designate links, the inner ends of which are loosely mounted on the shaft 89. The outer end of the link 92 is pivoted at 93 to the lower arm 94, the other end of which is pivoted at 94$^x$ to the lower, rear portion of the casing 3, while the outer end of the link 92$^x$ is pivoted at 93$^x$ to the upper arm 95, the other end of which is pivoted at 95$^x$ to the upper, rear portion of the casing 3. The links 92 and 92$^x$ carry the pawls 96 and 96$^x$ which engage the ratchet wheels 91 and 91$^x$ on either side of the drum 90 to revolve the latter, in a manner hereinafter described in connection with Figs. 8, 9 and 10.

The operation of the drum 90 is as follows:—

Figure 9:
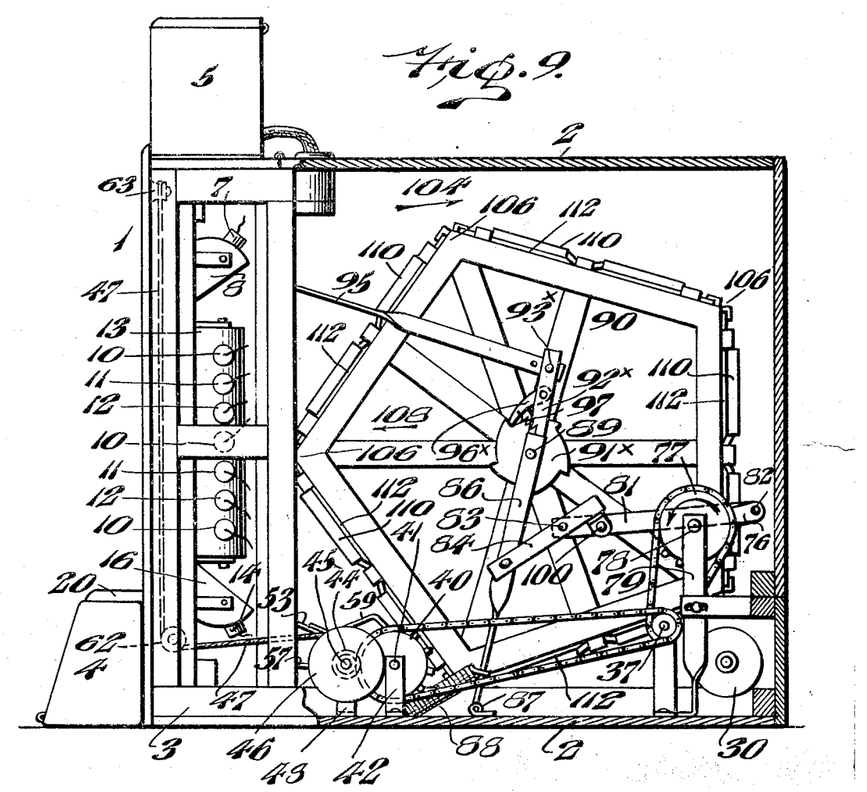
Figure 9, represents a view similar to Figure 8, taken from the opposite direction and showing the drum in its retracted and rotating position.
Figure 10:
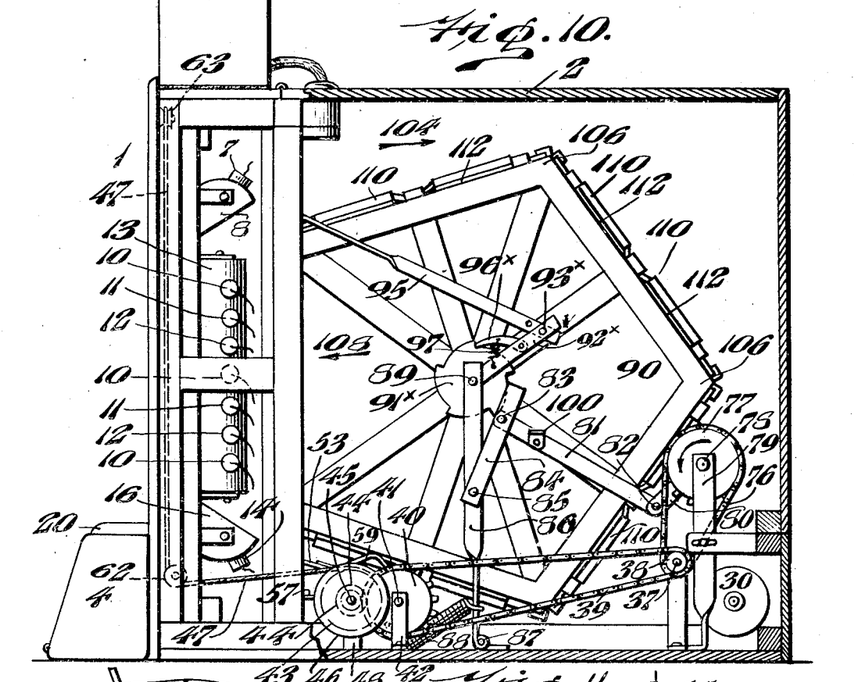
Figure 10, represents a view similar to Figure 9 and further illustrating the manner of operation and showing the drum in its stationary forward position.
Figure 11:
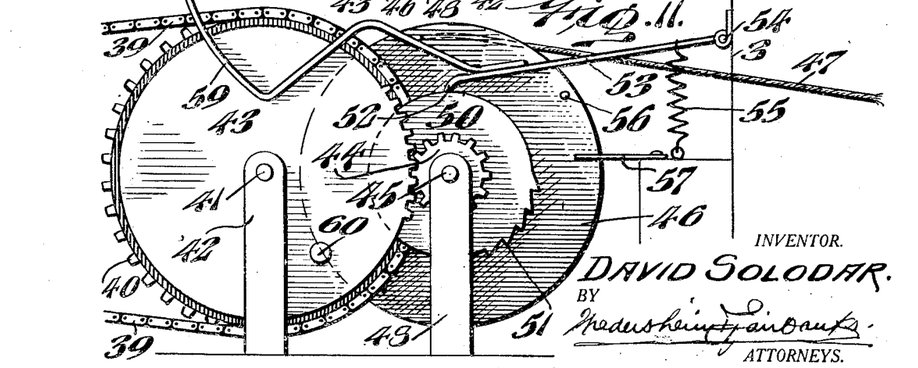
Figure 11, represents on an enlarged scale, details of construction of the curtain operating mechanism shown in Figure 10.

As the sprocket wheels 77 are revolved in the direction of the arrows the arms 81 and links 84 assume the position seen in Fig. 9, whereupon due to the contact of the links 84 with the stops 100 (which serve to limit the motion of said links) a lateral pull is exerted on the drum 90 in the direction of the arrow 104, that is, away from the casing 3, against the tension of the springs 88. The retracting of the drum 90 from the casing 3 is necessary to permit rotation by reason of the polygonal contour of said drum, that is, to permit the corners 106 of said drum to clear the rear walls of the casing 3.

The lateral pull exerted on the drum 90 in the direction of the arrow 104, causes the pawl 96$^x$ which engages the ratchet wheel 91$^x$ and which is carried by the link 92$^x$, which latter is pivoted to the upper arm 95, to revolve the drum 90 into the position seen in Fig. 9. In other words the drum 90 is first pulled away or retracted from the casing 3 when said drum is in the position seen in Fig. 10, by the revolution of the sprocket wheels 77 to bring the arms 81 and links 84 into the position seen in Fig. 9. The movement of the drum against the relatively fixed pawl 96$^x$ engaging the ratchet wheel 91$^x$ causes a partial revolution of said drum simultaneously and commensurate with the lateral movement of said drum away from the casing 3 due to the pull exerted by the arms 81 and links 84 by the rotation of the pins 80 carried by the sprocket wheel 77 when the dead center of this toggle link arrangement has been passed, that is when the pins 82, arms 81 and links 84 cease to exert a pull on the drum 90, and assume the positions seen in Figs. 8 and 10, the springs 88 pulling on the levers 86 tend to draw the drum towards the casing 3 in the direction of the arrow 108, against the relatively fixed pawl 96, carried by the link 92 which is pivoted to the lower arm 94. This causes the drum 90 to revolve from the position seen in Fig. 9 to the position seen in Figs. 8 and 10. In other words the drum 90 is revolved partly by the pawl 96$^x$, due to the movement of said drum away from the casing 3 in the direction of the arrow 104 (due to the pull exerted by the arms 81 and links 84, and partly by the pawl 96 due to the movement of said drum toward the casing 3 due to the tension of the springs 88. In this way the various faces of the polygonal drum 90 are successively presented to view through the front casing 3 when the curtain 6 is raised, the rotation of the drum 90 taking place while the curtain 6 is dropped.

Figure 6:
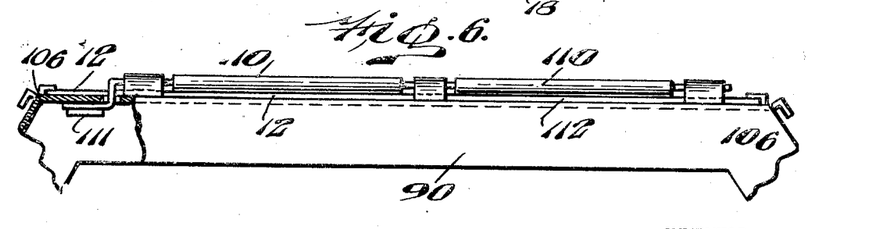
Figure 6, represents a fragmentary view showing details of the drum construction.

Referring to Fig. 6, it will be seen that the drum 90 is provided with clamps 110, which are under the tension of the springs 111, whereby the edges of the picture cards 112, or other objects displayed on said drum may be clamped, thereby greatly facilitating the changing of said picture cards or other objects. The drum 90 is formed of any suitable light and rigid construction such as that illustrated in the accompanying drawings.

Figure 12:
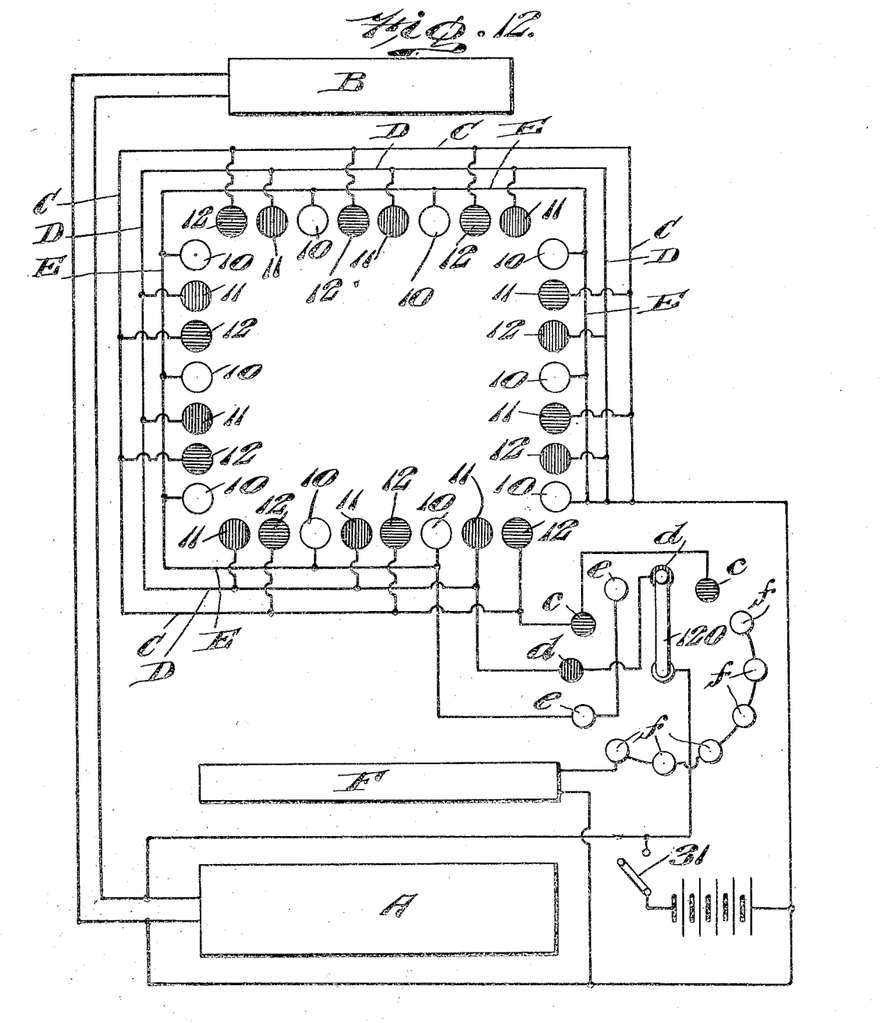
Figure 12, represents diagrammatically a wiring plan for securing the desired lighting effects of my novel miniature stage advertising device.

The shaft 78 also carries the sprocket wheel 115, over which passes the sprocket chain 116 which also passes over the sprocket wheel 117 fast on the shaft 118. The sprocket wheel 117 carries movable contact 120 which is adapted to contact with the various stationary contact points on the contact plate 121. The various contact points on the contact plate 121 are hooked up in the circuits illustrated in Fig. 12 and serve to energize the various lights in the casings 3, 4 and 5, hereinbefore described, in the following manner. In Fig. 12 I have illustrated two circuits A and B for energizing the lights 28 in the upper casing 5 and the lights 21 in the front lower casing 4, said circuits being completed and broken by the switch 31 and when completed, said circuits will energize the lights in the casings 4 and 5 in a continuous, uninterrupted manner. The vari-colored lights 10, 11 and 12 in the top, side and bottom reflectors 8, 13 and 16 respectively, are energized by the circuits C, D and E which are closed intermittently by the movable contact 120 in connection with the contact points C, D and E on the contact plate 121, to produce intermittent varying lighting effects in the front casing 3. A sixth circuit F is provided for energizing the lights 22 in the reflector 24 which circuit is adapted to be closed intermittently by the contact of the movable contact 120 with the contact points f on the contact plate 121.

While I have shown my novel advertising device adapted for the display or advertising of motion picture films, it is to be understood that it is equally well adapted for use in banks, stores and similar institutions by merely changing or substituting different pictures or slogans 112 for those shown on the drum 90.

It is also within the scope of my invention to vary the shape and size of the drum 90 as well as its general construction and assembly to meet the various requirements. In adapting my novel advertising device to the needs of a bank, I may alter the front appearance of the device to simulate the appearance of a bank façade. Similar alteration can be made in the general form and front appearance of the device to render it suggestive of the subject matter of the advertisement being displayed.

While I have shown the switch 31 as being carried by the casing 2, it is to be understood that where my novel advertising device is employed on a large scale and positioned on the roofs of buildings or on elevated scaffolding, the switch 31 may be located at any proximate, accessible point, whereby the device may be turned on or off at will.

It will be apparent to those skilled in the art that the best optical results in devices of this character are obtained by employing a flat rectilinear surface carrying the pictures, portraits, plates or other indicia, which is disposed vertically when it comes to a state of rest in its front position in close proximity to the lighting effects. This condition can be best obtained by a polygonal drum, whose front, flat surface is caused to come to a state of rest when it is vertically positioned with respect to the lights, as compared with a cylindrical surface maintaining and carrying the pictures or indicia which it is desired to display.

To the above ends I have shown my novel drum as composed of five sides, but it will be evident that the number of sides can be increased or diminished according to requirements. It is desirable for devices of this general character to be made as compact as possible. To this end I have provided the tension levers 86 which permit the drum to be retracted at the proper intervals to a sufficient extent for its corners to clear the front of the casing, means being provided to temporarily arrest the movement of the drum when its front rectilinear face is vertical and in its extreme forward position, during which period the lights are energized. While various mechanisms may be employed to intermittently rotate the drum and to advance and retract it, as each front face assumes its forward vertical position, I have shown in the present instance one form of mechanism which I have found to give satisfactory results in practice.

It will be understood however, that the details of said actuating mechanism can be varied if desired, it being however essential that the curtain actuating mechanism together with the drum actuating mechanism be so correlated that the movement of the drum is temporarily arrested during the period that the curtains are opened and a front face of said drum is standing vertical, so as to be illuminated by the lighting devices. It is also essential and desirable that the curtains should be closed during the rotation and forward and back movements of the drum, which may be effected by other mechanisms differing in detail from that herein shown.

Figure 4:
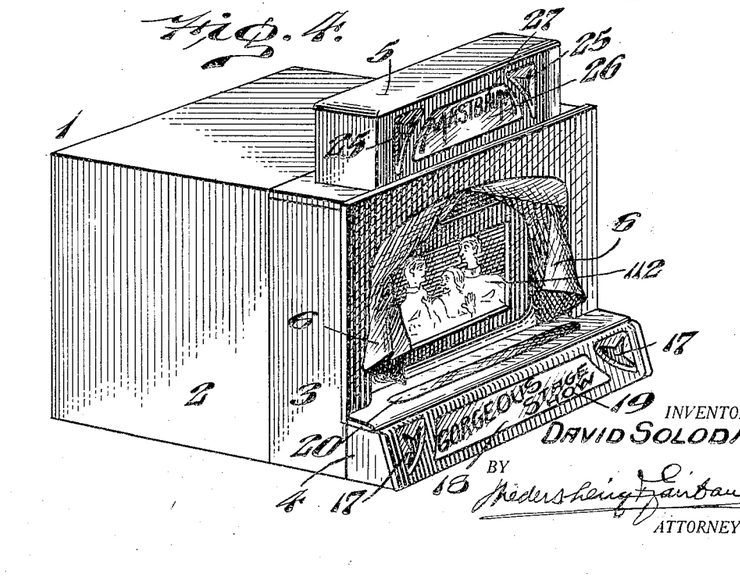
Figure 4, represents a perspective view of Figure 1.
Figure 5:
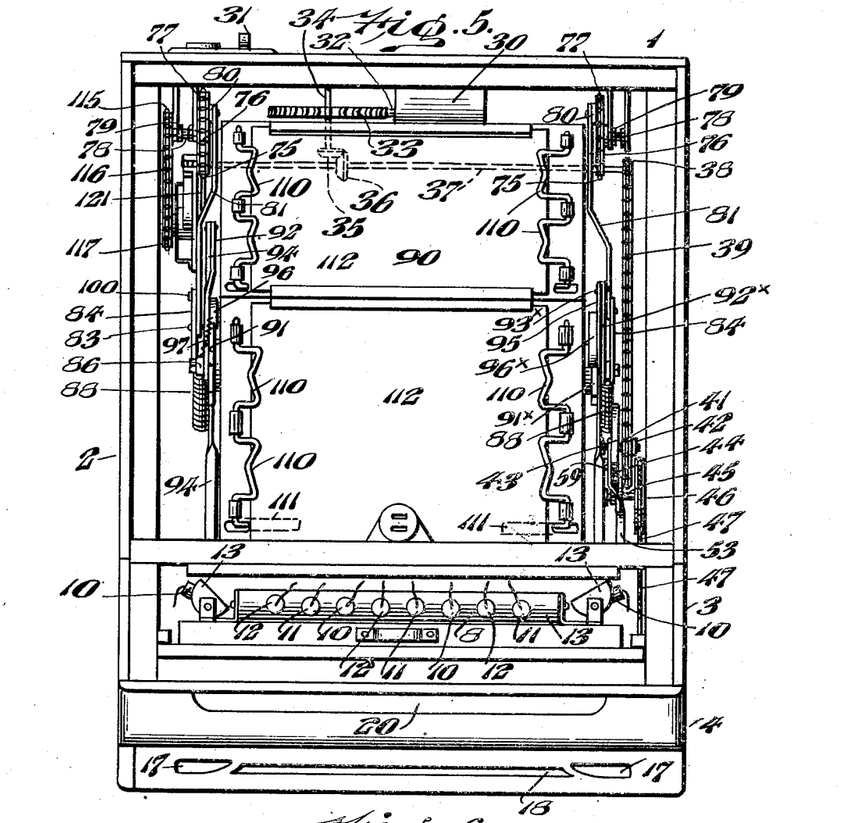
Figure 5, represents a plan view of a novel miniature stage advertising device embodying my invention with the outer casing removed to show the internal construction.

By making the casing in sections as will be understood from Figs. 3 and 4, it will be apparent that access is readily had to the different mechanisms at all times and by the employment of the upper and lower casings and the front casing having the reflectors and illuminating devices collocated substantially as will be understood from Fig. 3 a very striking and unique effect is imparted to the entire apparatus during its operation.

It will further be seen that the energizing of the various lights, the opening and closing of the curtain 6 and the revolution of the drum 90 are all effected automatically and in synchronous relation to each other by the mere closing of the switch 31 and that my novel advertising device, once set in motion does not need any further attention except for the occasional changing of the pictures or other advertising material 112.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent, is:—

1. In an advertising device, a polygonal drum, tensioned levers in which said drum is rotatably mounted, means for intermittently rotating said drum, and means for retracting and advancing said levers and drum during the rotation of the latter.

2. In an advertising device, a polygonal drum, tensioned levers in which said drum is rotatably mounted, means for intermittently rotating said drum, means for retracting and advancing said levers and drum during the rotation of the latter, and means for temporarily arresting the forward movement of said drum when its faces are in their forward vertical position.

3. In an advertising device, a polygonal drum, tensioned levers in which said drum is rotatably mounted, means for intermittently rotating said drum, means for retracting and advancing said levers and drum during the rotation of the latter, and means for temporarily arresting the forward movement and rotation of said drum, when its faces are in their forward vertical position.

4. In an advertising device, a polygonal drum, tensioned levers in which said drum is rotatably mounted, means for intermittently rotating said drum, means for retracting and advancing said levers and drum during the rotation of the latter, and means for temporarily arresting the forward movement and rotation of said drum, when its front face is in its forward vertical position.

5. In an advertising device of the character stated, a stage, a vertically split sectional curtain therefor, a polygonal drum in the rear of said curtain, means for intermittently actuating said drum, means for opening the curtain sections when said drum reaches a state of rest, means for closing said curtains during the intermittent revolutions of said drum, and means for retracting and advancing said drum with respect to said curtain.

6. In an advertising device of the character stated, a stage, a vertically split sectional curtain therefor, a polygonal drum in the rear of said curtain, means for intermittently actuating said drum, means for opening the curtain sections when said drum reaches a state of rest, means for closing said curtain during the intermittent revolutions of said drum, means for retracting and advancing said drum with respect to said curtain, and means for temporarily arresting the rotation of said drum when said curtain is open.

7. In an advertising device of the character stated, a stage, a vertically split sectional curtain therefor, a polygonal drum in the rear of said curtain, means for intermittently actuating said drum, means for opening the curtain sections when said drum reaches a state of rest, means for closing said curtain during the intermittent revolutions of said drum, means for retracting and advancing said drum with respect to said curtain, and means for temporarily arresting the rotation of said drum when its front face stands vertical and said curtain is open.

8. In a device of the character stated, a casing, a vertically split drop curtain for the front thereof, a horizontally disposed polygonal drum in said casing in the rear of said curtain, means for moving said drum towards and away from said curtain, means for intermittently rotating said drum while the latter is in retracted position, sets of varicolored lights for the front of said casing, means for opening and closing said curtain, and means for intermittently energizing said lights.

9. In a device of the character stated, a casing, a vertically split curtain for the front of said casing, means for normally retaining said curtain in its lower, closed position, a flexible element having one end thereof connected to the inner juxtaposed edges of the curtain sections, a pulley to which the other end of said flexible element is connected, an automatic actuating mechanism for revolving said pulley through a predetermined circumferential distance to raise said curtain, means for limiting the revolution of said pulley, means for retaining said pulley stationary for a predetermined length of time, means for releasing said pulley to permit its revolution in the reverse direction to close said curtain, and a display drum revolubly mounted behind said curtain.

10. In a device of the character stated, a casing, a vertically split curtain for the front of said casing, means for normally retaining said curtain in its lower, closed position, a flexible element having one end thereof connected to the inner juxtaposed edges of the curtain sections, a pulley to which the other end of said flexible element is connected, an automatic actuating mechanism for revolving said pulley through a predetermined circumferential distance to raise said curtain, means for limiting the revolution of said pulley, means for retaining said pulley stationary for a predetermined length of time, means for releasing said pulley to permit the revolution in the reverse direction to close said curtain, a display drum revolubly mounted behind said curtain, and means for revolving said drum while said curtain is in its lower, closed position.

11. In a device of the character stated, a casing, a vertically split curtain for the front of said casing, means for normally retaining said curtain in its lower, closed position, a flexible element having one end thereof connected to the inner juxtaposed edges of the curtain sections, a pulley to which the other end of said flexible element is connected, an automatic actuating mechanism for revolving said pulley through a predetermined circumferential distance to raise said curtain, means for limiting the revolution of said pulley, means for retaining said pulley stationary for a predetermined length of time, means for releasing said pulley to permit the revolution in the reverse direction to close said curtain, a display drum revolubly mounted behind said curtain, means for revolving said drum while said curtain is in its lower, closed position, a series of vari-colored lights in the front of said casing, and means for energizing said lights in synchronized timed relation with the actuation of said curtain and said drum.

12. In a device of the character stated, the combination of a revoluble polygonal drum, a sectional casing therefor comprising a front compartment, means for moving said drum towards and away from said front compartment, upper, lower and side reflectors in said front compartment, lights in said reflectors, means for intermittently rotating said drum and a connection from said drum actuating mechanism for energizing said lights, when said drum is in its extreme forward position and temporarily stationary.

13. In a device of the character stated, the combination of a revoluble polygonal drum, a sectional casing therefor, comprising a front compartment, means for moving said drum towards and away from said front compartment, upper, lower and side reflectors, in said front compartment, lights in said reflectors, means for intermittently revolving said drum, connections from said drum actuating mechanism for energizing said lights when said drum is in its extreme forward position and temporarily stationary, vertically divided curtains in front of said drum and lights, and connections from said drum actuating mechanism for opening said curtains when said drum is in its extreme forward position and in a state of rest, and means for effecting the closing of said curtains while said drum is rotating and being retracted from said curtains.

DAVID SOLODAR.